United States Patent
Tsuji

[11] Patent Number: 5,774,830
[45] Date of Patent: Jun. 30, 1998

[54] CAR NAVIGATION SYSTEM

[75] Inventor: Hiroaki Tsuji, Yokohama, Japan

[73] Assignee: Matsushita Electric Industrial Co., Ltd., Osaka, Japan

[21] Appl. No.: 586,316

[22] Filed: Jan. 17, 1996

[30] Foreign Application Priority Data

Jan. 24, 1995 [JP] Japan ................................... 7-008661

[51] Int. Cl.$^6$ .............................................. G06F 165/00
[52] U.S. Cl. .......................... 701/213; 340/990; 340/995
[58] Field of Search ................................ 364/443, 449.1, 364/449.2, 449.5, 449.7, 450; 73/178 R; 340/988, 990, 995; 342/357; 701/200, 206, 207, 211, 213, 217

[56] References Cited

U.S. PATENT DOCUMENTS

| | | | |
|---|---|---|---|
| 4,731,613 | 3/1988 | Endo et al. ............................ | 364/450 |
| 4,807,157 | 2/1989 | Fukushima et al. .................. | 364/449.7 |
| 4,965,574 | 10/1990 | Fukushima et al. .................... | 340/995 |
| 5,598,339 | 1/1997 | Yoshihara et al. ................... | 364/449.7 |

FOREIGN PATENT DOCUMENTS

| | | |
|---|---|---|
| 0523918 | 1/1993 | European Pat. Off. . |
| 518767 | 1/1993 | Japan . |
| 9416504 | 7/1994 | WIPO . |

*Primary Examiner*—Gary Chin
*Attorney, Agent, or Firm*—Pollock, Vande Sande & Priddy

[57] ABSTRACT

A navigation system includes a GPS receiver. Detection is made as to a number of GPS radio signals received by the GPS receiver. A display is operative for indicating a picture. At least one of a color tone and a luminance of the picture indicated by the display is controlled in response to the detected GPS radio signal number. Calculation may be made as to a rate of a decrease in the GPS radio signal number. In this case, at least one of the color tone and the luminance of the picture indicated by the display is controlled in response to the calculated decrease rate.

3 Claims, 5 Drawing Sheets

5,774,830

CAR NAVIGATION SYSTEM

BACKGROUND OF THE INVENTION

1. Field of the Invention

This invention relates to a navigation system for a vehicle which uses the global positioning system (the GPS).

2. Description of the Prior Art

The global positioning system (the GPS) is a satellite navigation system including artificial satellites which radiate radio signals for positioning purposes. There are car navigation systems using the GPS.

Japanese published unexamined patent application 5-18767 discloses a navigation system including a GPS receiver, a microcomputer, and a color display. In the navigation system of Japanese application 5-18767, the microcomputer derives information of the present position, the present date, and the present time from satellite radio signals received by the GPS receiver. The microcomputer calculates the sunrise time and the sunset time at the present position by referring to reference sunrise and sunset data. The microcomputer compares the present time with the calculated sunrise time and sunset time, thereby deciding whether the present time exists in the daytime or the nighttime. A day/night signal is generated as an indication of the result of the decision. In the navigation system of Japanese application 5-18767, the brightness of the screen of the display is controlled in response to the day/night signal. Also, the color tone of the screen of the display is controlled in response to the day/night signal.

SUMMARY OF THE INVENTION

It is an object of this invention to provide an improved navigation system.

A first aspect of this invention provides a navigation system comprising a GPS receiver; first means for detecting a number of GPS radio signals received by the GPS receiver; a display for indicating a picture; and second means connected to the first means and the display for controlling at least one of a color tone and a luminance of the picture indicated by the display in response to the GPS radio signal number detected by the first means.

A second aspect of this invention provides a navigation system comprising a GPS receiver; first means for detecting a number of GPS radio signals received by the GPS receiver; second means connected to the first means for calculating a rate of a decrease in the GPS radio signal number detected by the first means; a display for indicating a picture; and third means connected to the second means and the display for controlling at least one of a color tone and a luminance of the picture indicated by the display in response to the decrease rate calculated by the second means.

A third aspect of this invention provides a navigation system for a vehicle, comprising a GPS receiver; first means for detecting a number of GPS radio signals received by the GPS receiver; a display for indicating a picture; second means connected to the first means and the display for controlling at least one of a color tone and a luminance of the picture indicated by the display in response to the GPS radio signal number detected by the first means; third means for deciding whether or not a present time at a present position of the vehicle is in a prescribed time interval corresponding to a nighttime; and fourth means connected to the third means and the display for controlling at least one of the color tone and the luminance of the picture indicated by the display in response to a result of said deciding by the third means.

A fourth aspect of this invention provides a navigation system comprising a GPS receiver; first means for detecting a number of GPS radio signals received by the GPS receiver; second means connected to the first means for calculating a rate of a decrease in the GPS radio signal number detected by the first means; a display for indicating a picture; third means connected to the second means and the display for controlling at least one of a color tone and a luminance of the picture indicated by the display in response to the decrease rate calculated by the second means; fourth means for deciding whether or not a present time at a present position of the vehicle is in a prescribed time interval corresponding to a nighttime; and fifth means connected to the fourth means and the display for controlling at least one of the color tone and the luminance of the picture indicated by the display in response to a result of said deciding by the fourth means.

DESCRIPTION OF THE PREFERRED EMBODIMENTS

First Embodiment

Figure 1:
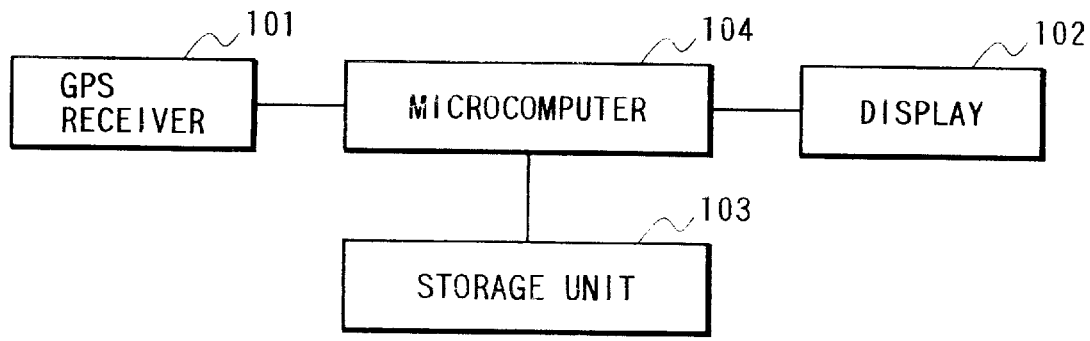
FIG. 1 is a block diagram of a car navigation system according to a first embodiment of this invention.

With reference to FIG. 1, a car navigation system includes a GPS receiver 101, a color display 102, a storage unit 103, and a microcomputer 104. The GPS receiver 101, the color display 102, and the storage unit 103 are connected to the microcomputer 104.

The GPS receiver 101 catches radio signals from GPS satellites. The GPS receiver 101 subjects the received satellite radio signals to given processing, and thereby derives information of the present position of a related car from the received satellite radio signals. The GPS receiver 101 outputs the information of the present car position to the microcomputer 104.

The GPS receiver 101 has a section for generating information of the number of successfully-received radio signals transmitted from different GPS satellites. The GPS receiver 101 outputs the information of the received radio signal number to the microcomputer 104.

The GPS receiver 101 sequentially and periodically executes a satellite selecting task, a Doppler-shift calculating task, a satellite acquiring task, and a satellite tracking task. During the execution of the satellite selecting task, the GPS receiver 101 selects GPS satellites from among all the GPS satellites. The selected GPS satellites are such that the radio signals therefrom can be received at the present car position and the present time. The GPS receiver 101 stores information of the orbits of all the GPS satellites. The selection of GPS satellites is implemented by referring to the orbit information, the car position information, and the time information. During the execution of the Doppler-shift calculating task, the GPS receiver 101 calculates the accurate orbit of each of the selected GPS satellites, and calculates a Doppler shift in radio signal from each of the selected GPS satellites by using the calculated accurate orbit thereof. During the execution of the satellite acquiring task, identification (ID) signals corresponding to the selected GPS satellites are set in pseudo noise code generators respectively. Therefore, pseudo noise code signals corresponding to the selected GPS satellites are produced by the pseudo noise code generators respectively. Subsequently, the GPS receiver 101 starts a process of acquiring the synchronization between a received composite radio signal and each of the pseudo noise code signals. The calculated Doppler shifts are used in the synchronization acquiring process. When the synchronization between a received composite radio signal and one of the pseudo noise code signals has been acquired, a signal representing the completion of the acquisition of the synchronization is generated in the GPS receiver 101. The acquisition-completion signal indicates successful reception of the radio signal from one of the selected GPS satellites. Other acquisition-completion signals can be generated for other selected GPS satellites. The GPS receiver 101 outputs the acquisition-completion signal or signals as the information of the received radio signal number. During the execution of the satellite tracking process, the GPS receiver 101 performs a process of maintaining (tracking) the synchronization between a received composite radio signal and each of the pseudo noise code signals. When the synchronization between a received composite radio signal and one of the pseudo noise code signals is maintained, a signal representing the maintenance of the synchronization is generated in the GPS receiver 101. The synchronization-maintenance signal indicates successful reception of the radio signal from one of the selected GPS satellites. Other synchronization-maintenance signals can be generated for other selected GPS satellites. The GPS receiver 101 outputs the synchronization-maintenance signal or signals as the information of the received radio signal number.

The storage unit 103 holds data of a map. The storage unit 103 includes, for example, a CD-ROM and a drive for the CD-ROM. The storage unit 103 outputs the data of the map to the microcomputer 104.

The microcomputer 104 includes a combination of an input/output port (an interface), a CPU, a RAM, and a ROM. The microcomputer 104 operates in accordance with a program stored in the ROM.

The microcomputer 104 receives the information of the present car position from the GPS receiver 101. The microcomputer 104 receives the data of the map from the storage unit 103. The microcomputer 104 generates a video signal in response to the information of the present car position and the data of the map. For example, a picture represented by the generated video signal has a mark indicating the present car position, and also a part of the map around the present car position. The microcomputer 104 outputs the video signal to the display 102.

The display 102 receives the video signal from the microcomputer 104. A picture represented by the video signal is visualized on the screen of the display 102.

The microcomputer 104 receives the information of the received radio signal number from the GPS receiver 101. The microcomputer 104 adjusts at least one of the luminance component (the brightness component) and the color tone component of the video signal in response to the information of the received radio signal number. Therefore, at least one of the brightness (the luminance) and the color tone of the picture indicated on the screen of the display 102 depends on the received radio signal number.

Figure 2:
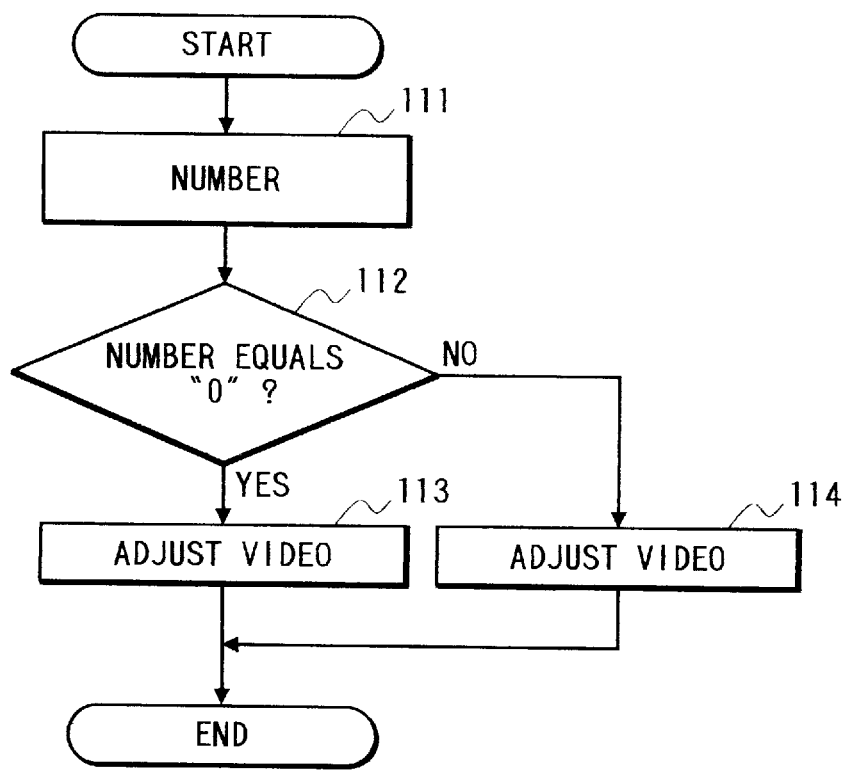
FIG. 2 is a flowchart of a segment of a program for controlling a microcomputer in FIG. 1.

As previously described, the microcomputer 104 operates in accordance with a program stored in the internal ROM. FIG. 2 is a flowchart of a segment of the program which is iteratively executed at a given period.

As shown in FIG. 2, a first step 111 of the program segment receives the information of the received radio signal number from the GPS receiver 101. A step 112 following the step 111 decides whether or not the received radio signal number is equal to "0". When the received radio signal number is equal to "0", the program advances from the step 112 to a step 113. When the received radio signal number differs from "0", the program advances from the step 112 to a step 114. The step 113 sets the video signal into first brightness and color-tone conditions. After the step 113, the current execution cycle of the program segment ends. The step 114 sets the video signal into second brightness and color-tone conditions which differ from the first brightness and color-tone conditions. After the step 114, the current execution cycle of the program segment ends.

When the related car enters a tunnel or an underground passage, the received radio signal number decreases to "0". Therefore, in this case, the video signal is set by the step 113 into the first brightness and color-tone conditions. The first brightness and color-tone conditions are designed to provide a good visibility regarding a picture indicated on the display 102 in the case where the related car is in a dark environment. According to an example of the first brightness and color-tone conditions, background portions of the picture are black while character-corresponding portions thereof are white and road-corresponding portions thereof are red.

When the related car exits from a tunnel or an underground passage, the received radio signal number increases from "0". Therefore, in this case, the video signal is set by the step 114 into the second brightness and color-tone conditions. The second brightness and color-tone conditions are designed to provide a good visibility regarding a picture indicated on the display 102 in the case where the related car is in a light environment. According to an example of the second brightness and color-tone conditions, background portions of the picture are white while character-corresponding portions thereof are black and road-corresponding portions thereof are red.

Second Embodiment

Figure 3:
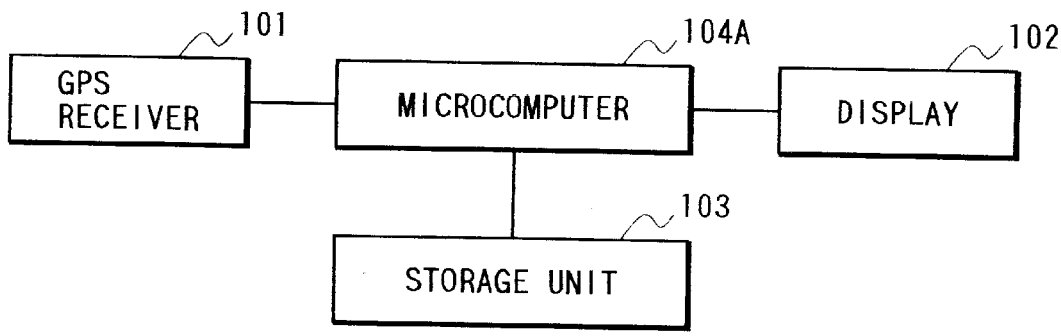
FIG. 3 is a block diagram of a car navigation system according to a second embodiment of this invention.

FIG. 3 shows a second embodiment of this invention which is similar to the embodiment of FIGS. 1 and 2 except that a microcomputer 104A is used in place of the microcomputer 104 of FIG. 1.

Figure 4:
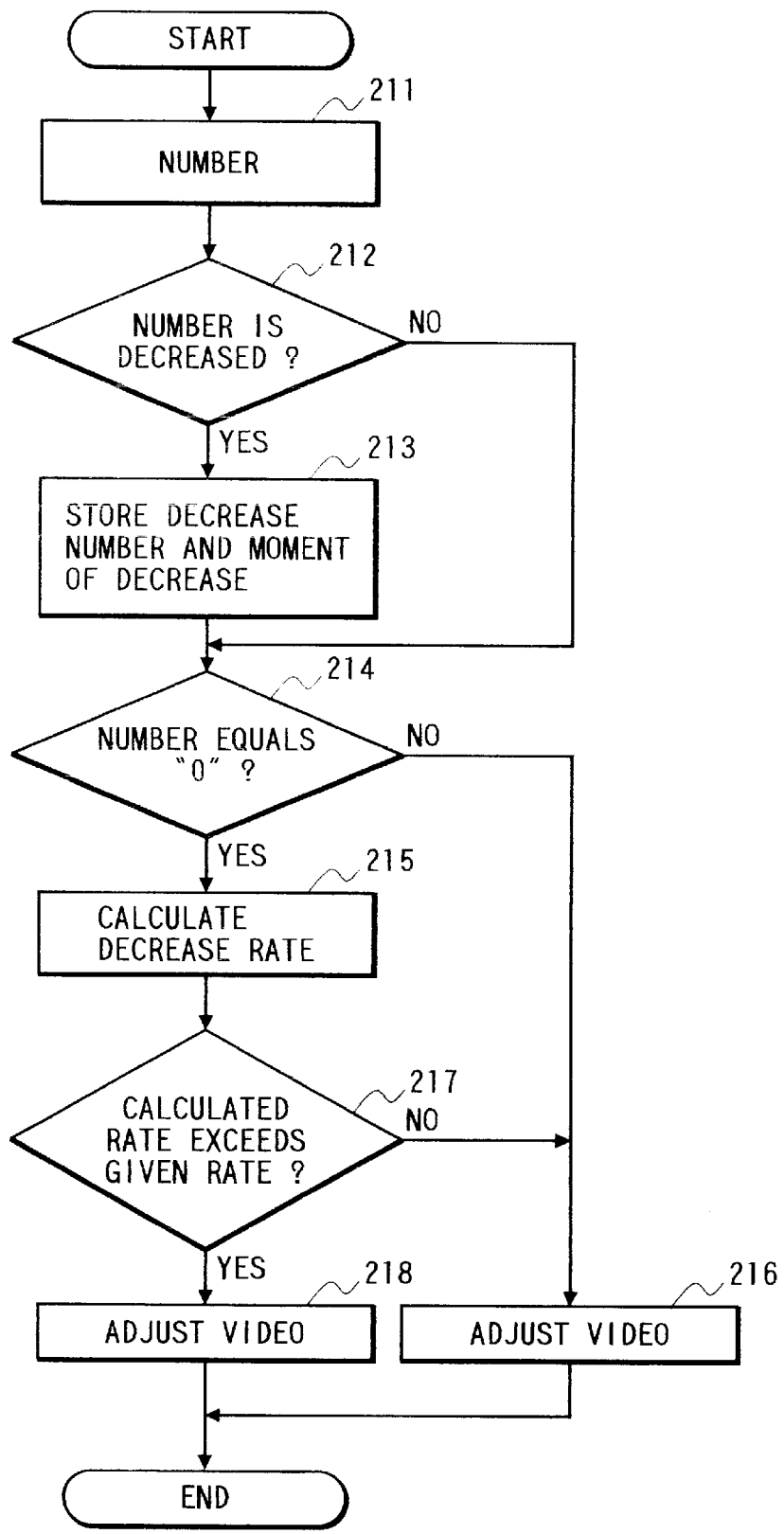
FIG. 4 is a flowchart of a segment of a program for controlling a microcomputer in FIG. 3.

The microcomputer 104A operates in accordance with a program stored in an internal ROM. FIG. 4 is a flowchart of a segment of the program which is iteratively executed at a given period.

As shown in FIG. 4, a first step 211 of the program segment receives the information of a received radio signal number from a GPS receiver 101. The step 211 stores the information of the received radio signal number into a RAM within the microcomputer 104A. A step 212 following the step 211 calculates the difference between the received radio signal number occurring in the current execution cycle of the program segment and the received radio signal number occurring in the immediately previous execution cycle of the program segment, and thereby decides whether or not the currently received radio signal number is decreased from the previously received radio signal number. When the currently received radio signal number is decreased from the previously received radio signal number, the program advances from the step 212 to a step 213. Otherwise, the program jumps from the step 212 to a step 214.

The step 213 stores information of the difference (the decrease number) between the currently received radio signal number and the previously received radio signal number into the RAM within the microcomputer 104A. Further, the step 213 stores information of the moment of the occurrence of the decrease in the received radio signal number. After the step 213, the program advances to the step 214.

The step 214 decides whether or not the currently received radio signal number is equal to "0". When the currently received radio signal number is equal to "0", the program advances from the step 214 to a step 215. When the currently received radio signal number differs from "0", the program advances from the step 214 to a step 216. The step 215 calculates an average rate of the decrease in the received radio signal number from a given number (for example, "3" or "4") to "0" by referring to the decrease-number information and the decrease-occurrence-moment information provided in the current and previous execution cycles of the program segment. A step 217 following the step 215 decides whether or not the average rate calculated by the step 215 is greater than a given rate. When the average rate is greater than the given rate, the program advances from the step 217 to a step 218. Otherwise, the program advances from the step 217 to the step 216.

The step 218 sets a video signal into first brightness and color-tone conditions. After the step 218, the current execution cycle of the program segment ends. The step 216 sets the video signal into second brightness and color-tone conditions which differ from the first brightness and color-tone conditions. After the step 216, the current execution cycle of the program segment ends.

In the case where a related car enters an urban area, the received radio signal number sometimes gradually decreases to "0". Therefore, in this case, the program advances from the step 217 to the step 216 so that the video signal is set by the step 216 into the second brightness and color-tone conditions. The second brightness and color-tone conditions are designed to provide a good visibility regarding a picture indicated on a display 102 in the case where the related car is in a light environment. According to an example of the second brightness and color-tone conditions, background portions of the picture are white while character-corresponding portions thereof are black and road-corresponding portions thereof are red.

In the case where the related car enters a tunnel or an underground passage, the received radio signal number abruptly decreases to "0". Therefore, in this case, the program advances from the step 217 to the step 218 so that the video signal is set by the step 218 into the first brightness and color-tone conditions. The first brightness and color-tone conditions are designed to provide a good visibility regarding a picture indicated on the display 102 in the case where the related car is in a dark environment. According to an example of the first brightness and color-tone conditions, background portions of the picture are black while character-corresponding portions thereof are white and road-corresponding portions thereof are red.

This embodiment may be modified as follows. In the case where the received radio signal number continues to be "0" for longer than a given time interval, the step 218 is executed regardless of the rate of the decrease in the received radio signal number.

Third Embodiment

Figure 5:
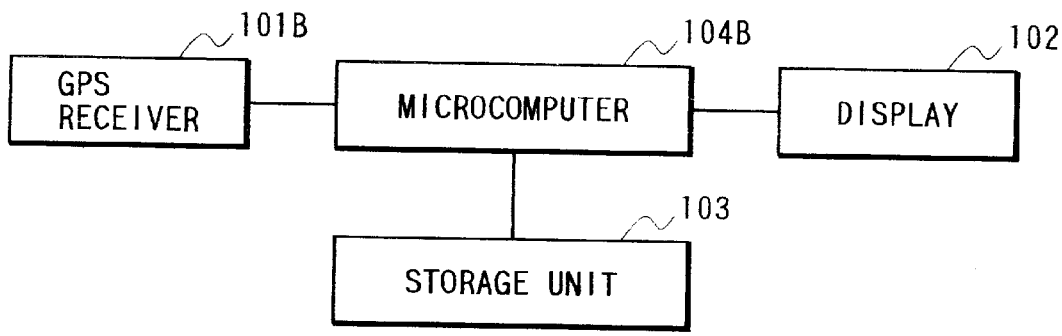
FIG. 5 is a block diagram of a car navigation system according to a third embodiment of this invention.

FIG. 5 shows a third embodiment of this invention which is similar to the embodiment of FIGS. 1 and 2 except that a GPS receiver 101B and a microcomputer 104B are used in place of the GPS receiver 101 and the microcomputer 104 of FIG. 1. The GPS receiver 101B is similar to the GPS receiver 101 of FIG. 1 except for an additional arrangement indicated hereinafter.

The GPS receiver 101B derives information of the present date from received satellite radio signals. The GPS receiver 101B outputs the information of the present date to the microcomputer 104B. Also, the GPS receiver 101B derives information of the present time from the received satellite radio signals. The GPS receiver 101B outputs the information of the present time to the microcomputer 104B.

Figure 6:
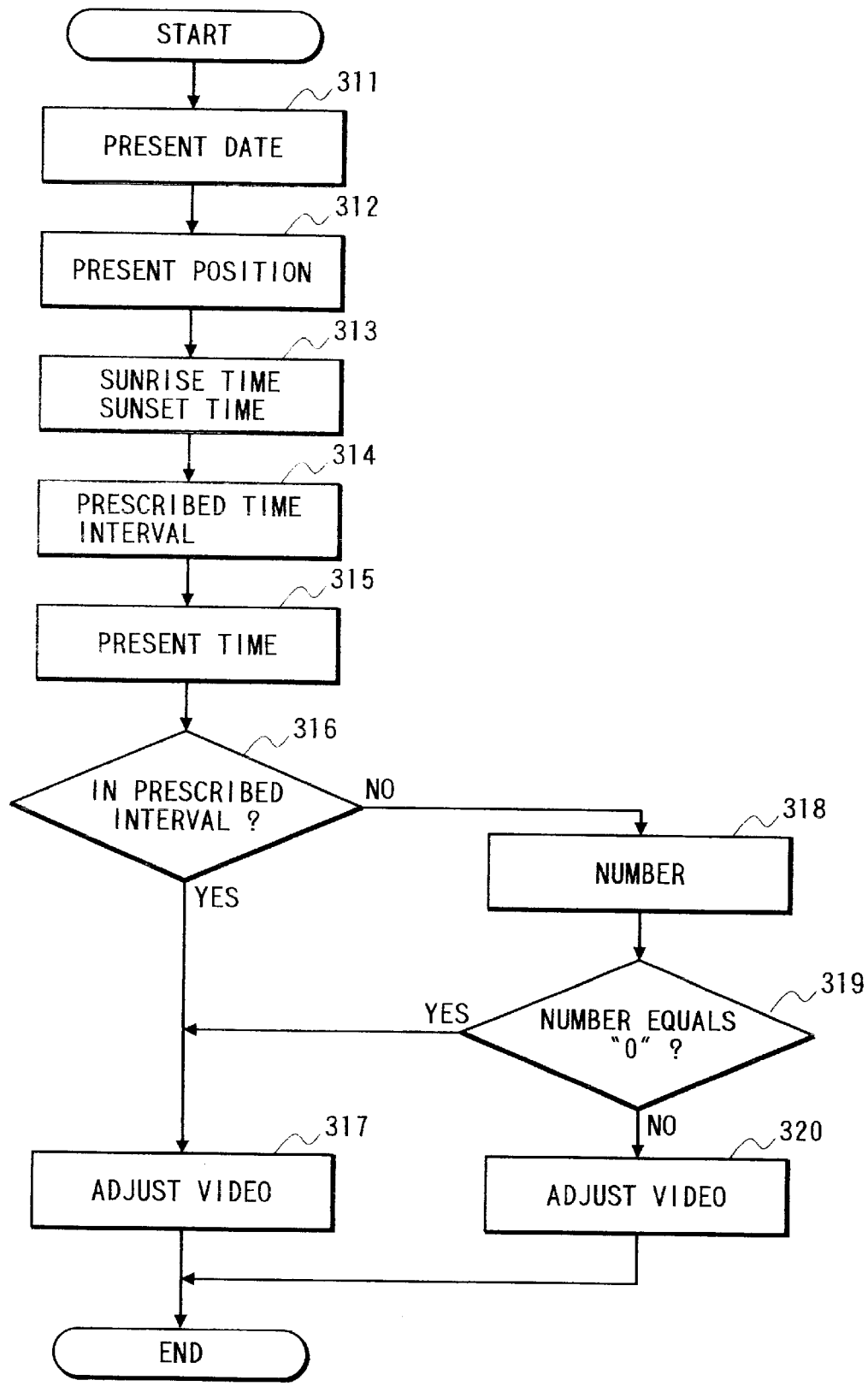
FIG. 6 is a flowchart of a segment of a program for controlling a microcomputer in FIG. 5.

The microcomputer 104B operates in accordance with a program stored in an internal ROM. FIG. 6 is a flowchart of a segment of the program which is iteratively executed at a given period.

As shown in FIG. 6, a first step 311 of the program segment receives the information of the present date from the GPS receiver 101B. A step 312 following the step 311 receives information of the present car position from the GPS receiver 101B. A step 313 following the step 312 estimates the sunrise time and the sunset time at the present car position from the present date by referring to reference sunrise and sunset data. The reference sunrise and sunset data is stored in a ROM within the microcomputer 104B.

A step 314 following the step 313 calculates a prescribed time interval from the estimated sunrise time and the estimated sunset time. The prescribed time interval corresponds to the nighttime. An example of the prescribed time interval starts one-hour after the sunset time, and terminates one-hour before the sunrise time. A step 315 following the step 314 receives the information of the present time from the GPS receiver 101B. In the case where the CPU 104B contains a clock, the used information of the present time may be generated by the clock.

A step 316 following the step 315 decides whether or not the present time is in the prescribed time interval. When the present time is in the prescribed time interval, the program advances from the step 316 to a step 317. Otherwise, the program advances from the step 316 to a step 318.

The step 318 receives the information of a received radio signal number from the GPS receiver 101B. A step 319 following the step 318 decides whether or not the received radio signal number is equal to "0". When the received radio signal number is equal to "0", the program advances from the step 319 to the step 317. When the received radio signal number differs from "0", the program advances from the step 319 to a step 320.

The step 317 sets a video signal into first brightness and color-tone conditions. After the step 317, the current execution cycle of the program segment ends. The step 320 sets the video signal into second brightness and color-tone conditions which differ from the first brightness and color-tone conditions. After the step 320, the current execution cycle of the program segment ends.

When the present time is in the prescribed time interval (corresponding to the nighttime), the program advances from the step 316 to the step 317 so that the video signal is set by the step 317 into the first brightness and color-tone conditions. The first brightness and color-tone conditions are designed to provide a good visibility regarding a picture indicated on a display 102 in the case where the related car is in a dark environment. According to an example of the first brightness and color-tone conditions, background portions of the picture are black while character-corresponding portions thereof are white and road-corresponding portions thereof are red.

In the case where the present time is out of the prescribed time interval (corresponding to the nighttime), when the related car enters a tunnel or an underground passage, the received radio signal number decreases to "0". Therefore, in this case, the program advances from the step 319 to the step 317 so that the video signal is set by the step 317 into the first brightness and color-tone conditions suited for the dark environment.

In the case where the present time is out of the prescribed time interval (corresponding to the nighttime), when the related car exits from a tunnel or an underground passage, the received radio signal number increases from "0". Therefore, in this case, the program advances from the step 319 to the step 320 so that the video signal is set by the step 320 into the second brightness and color-tone conditions. The second brightness and color-tone conditions are designed to provide a good visibility regarding a picture indicated on the display 102 in the case where the related car is in a light environment. According to an example of the second brightness and color-tone conditions, background portions of the picture are white while character-corresponding portions thereof are black and road-corresponding portions thereof are red.

Fourth Embodiment

Figure 7:
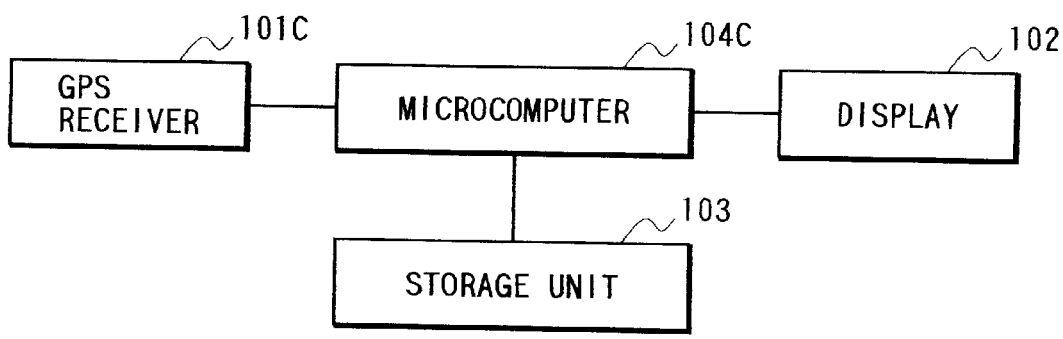
FIG. 7 is a block diagram of a car navigation system according to a fourth embodiment of this invention.

FIG. 7 shows a fourth embodiment of this invention which is similar to the embodiment of FIGS. 1 and 2 except that a GPS receiver 101C and a microcomputer 104C are used in place of the GPS receiver 101 and the microcomputer 104 of FIG. 1. The GPS receiver 101C is similar to the GPS receiver 101 of FIG. 1 except for an additional arrangement indicated hereinafter.

The GPS receiver 101C derives information of the present date from received satellite radio signals. The GPS receiver 101C outputs the information of the present date to the microcomputer 104C. Also, the GPS receiver 101C derives information of the present time from the received satellite radio signals. The GPS receiver 101C outputs the information of the present time to the microcomputer 104C.

Figure 8:
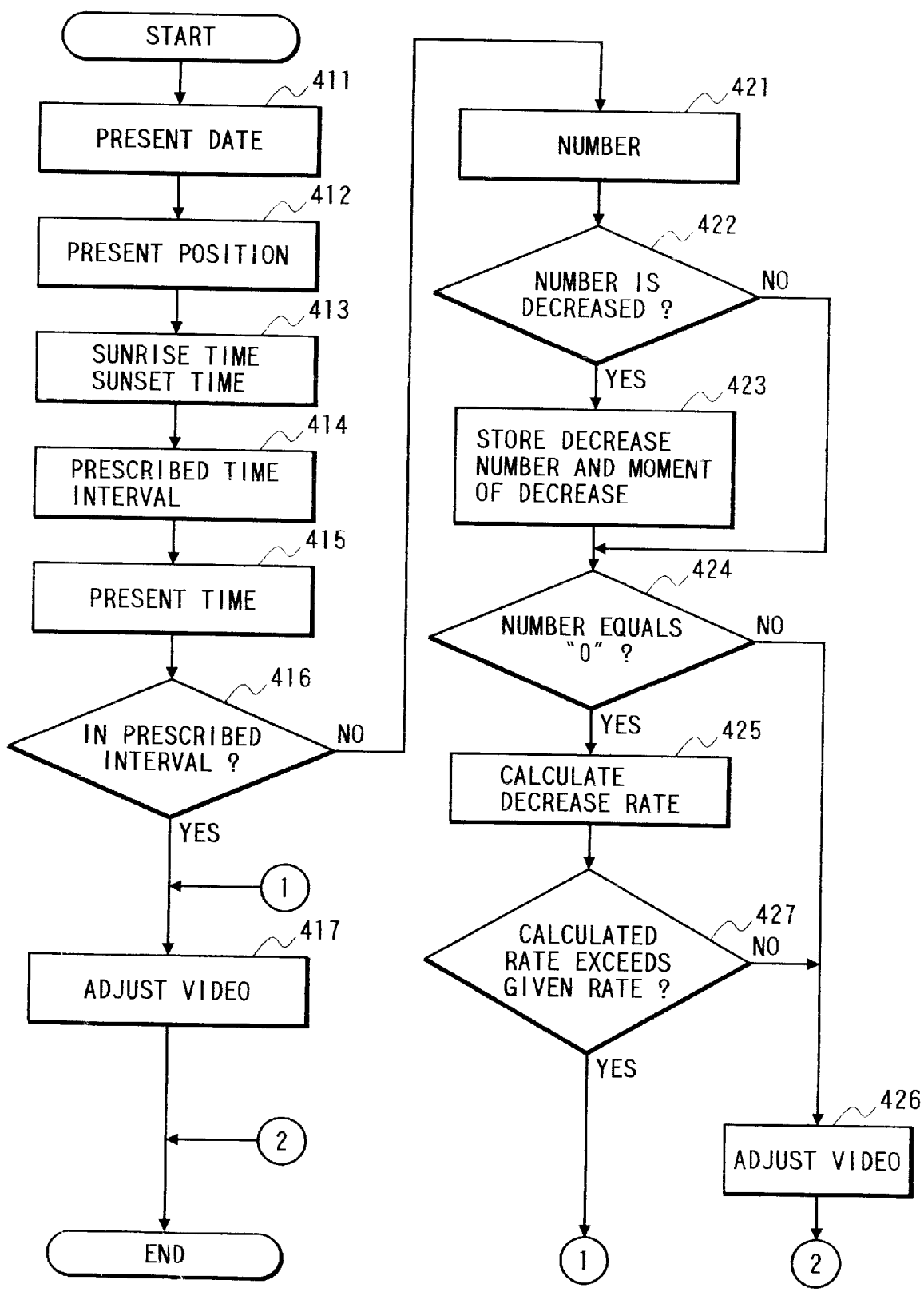
FIG. 8 is a flowchart of a segment of a program for controlling a microcomputer in FIG. 7.

The microcomputer 104C operates in accordance with a program stored in an internal ROM. FIG. 8 is a flowchart of a segment of the program which is iteratively executed at a given period.

As shown in FIG. 8, a first step 411 of the program segment receives the information of the present date from the GPS receiver 101C. A step 412 following the step 411 receives information of the present car position from the GPS receiver 101C. A step 413 following the step 412 estimates the sunrise time and the sunset time at the present car position from the present date by referring to reference sunrise and sunset data. The reference sunrise and sunset data is stored in a ROM within the microcomputer 104C.

A step 414 following the step 413 calculates a prescribed time interval from the estimated sunrise time and the estimated sunset time. The prescribed time interval corresponds to the nighttime. An example of the prescribed time interval starts one-hour after the sunset time, and terminates one-hour before the sunrise time. A step 415 following the step 414 receives the information of the present time from the GPS receiver 101C. In the case where the CPU 104C contains a clock, the used information of the present time may be generated by the clock.

A step 416 following the step 415 decides whether or not the present time is in the prescribed time interval. When the present time is in the prescribed time interval, the program advances from the step 416 to a step 417. Otherwise, the program advances from the step 416 to a step 421.

The step 421 receives the information of a received radio signal number from the GPS receiver 101C. The step 421 stores the information of the received radio signal number into a RAM within the microcomputer 104C. A step 422 following the step 421 calculates the difference between the received radio signal number occurring in the current execution cycle of the program segment and the received radio signal number occurring in the immediately previous execution cycle of the program segment, and thereby decides whether or not the currently received radio signal number is decreased from the previously received radio signal number. When the currently received radio signal number is decreased from the previously received radio signal number, the program advances from the step 422 to a step 423. Otherwise, the program jumps from the step 422 to a step 424.

The step 423 stores information of the difference (the decrease number) between the currently received radio signal number and the previously received radio signal number into the RAM within the microcomputer 104C. Further, the step 423 stores information of the moment of the occurrence of the decrease in the received radio signal number. After the step 423, the program advances to the step 424.

The step 424 decides whether or not the currently received radio signal number is equal to "0". When the currently received radio signal number is equal to "0", the program advances from the step 424 to a step 425. When the currently received radio signal number differs from "0", the program advances from the step 424 to a step 426. The step 425 calculates an average rate of the decrease in the received radio signal number from a given number (for example, "3" or "4") to "0" by referring to the decrease-number information and the decrease-occurrence-moment information provided in the current and previous execution cycles of the program segment. A step 427 following the step 425 decides whether or not the average rate calculated by the step 425 is greater than a given rate. When the average rate is greater than the given rate, the program advances from the step 427 to the step 417. Otherwise, the program advances from the step 427 to the step 426.

The step 417 sets a video signal into first brightness and color-tone conditions. After the step 417, the current execution cycle of the program segment ends. The step 426 sets the video signal into second brightness and color-tone conditions which differ from the first brightness and color-tone conditions. After the step 426, the current execution cycle of the program segment ends.

When the present time is in the prescribed time interval (corresponding to the nighttime), the program advances from the step 416 to the step 417 so that the video signal is set by the step 417 into the first brightness and color-tone conditions. The first brightness and color-tone conditions are designed to provide a good visibility regarding a picture indicated on a display 102 in the case where the related car is in a dark environment. According to an example of the first brightness and color-tone conditions, background portions of the picture are black while character-corresponding portions thereof are white and road-corresponding portions thereof are red.

In the case where the present time is out of the prescribed time interval (corresponding to the nighttime) and a related car enters an urban area, the received radio signal number sometimes gradually decreases to "0". Therefore, in this case, the program advances from the step 427 to the step 426 so that the video signal is set by the step 426 into the second brightness and color-tone conditions. The second brightness and color-tone conditions are designed to provide a good visibility regarding a picture indicated on the display 102 in the case where the related car is in a light environment. According to an example of the second brightness and color-tone conditions, background portions of the picture are white while character-corresponding portions thereof are black and road-corresponding portions thereof are red.

In the case where the present time is out of the prescribed time interval (corresponding to the nighttime), when the related car enters a tunnel or an underground passage, the received radio signal number abruptly decreases to "0". Therefore, in this case, the program advances from the step 427 to the step 417 so that the video signal is set by the step 417 into the first brightness and color-tone conditions suited for the dark environment.

What is claimed is:

1. A navigation system comprising:

a GPS receiver;

first means for detecting a number of GPS radio signals received by the GPS receiver;

second means connected to the first means for calculating a rate of a decrease in the GPS radio signal number detected by the first means;

a display for indicating a picture; and third means connected to the second means and the display for controlling at least one of a color tone and a luminance of the picture indicated by the display in response to the decrease rate calculated by the second means.

2. A navigation system for a vehicle, comprising:

a GPS receiver;

first means for detecting a number of GPS radio signals received by the GPS receiver;

a display for indicating a picture;

second means connected to the first means and the display for controlling a color tone of the picture indicated by the display in response to a rate of decrease in the GPS signal number based on the GPS radio signal number detected by the first means;

third means for deciding whether or not a present time at a present position of the vehicle is in a prescribed time interval corresponding to a nighttime; and fourth means connected to the third means and the display for controlling at least one of the color tone and the luminance of the picture indicated by the display in response to a result of said deciding by the third means.

3. A navigation system comprising:

a GPS receiver;

first means for detecting a number of GPS radio signals received by the GPS receiver;

second means connected to the first means for calculating a rate of a decrease in the GPS radio signal number detected by the first means;

a display for indicating a picture;

third means connected to the second means and the display for controlling at least one of a color tone and a luminance of the picture indicated by the display in response to the decrease rate calculated by the second means;

fourth means for deciding whether or not a present time at a present position of the vehicle is in a prescribed time interval corresponding to a nighttime; and fifth means connected to the fourth means and the display for controlling at least one of the color tone and the luminance of the picture indicated by the display in response to a result of said deciding by the fourth means.

* * * * *